United States Patent
Yamao et al.

(10) Patent No.: US 10,293,764 B2
(45) Date of Patent: May 21, 2019

(54) RESIN MOLDED BODY

(71) Applicant: Yazaki Corporation, Tokyo (JP)

(72) Inventors: Yoshimichi Yamao, Toyota (JP); Masayoshi Ogawa, Toyota (JP); Masanobu Suzuki, Okazaki (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 157 days.

(21) Appl. No.: 15/422,899

(22) Filed: Feb. 2, 2017

(65) Prior Publication Data
US 2017/0217386 A1  Aug. 3, 2017

(30) Foreign Application Priority Data
Feb. 3, 2016 (JP) .................................. 2016-019272

(51) Int. Cl.
*H02G 3/04* (2006.01)
*B60R 16/02* (2006.01)

(52) U.S. Cl.
CPC .................................. *B60R 16/0215* (2013.01)

(58) Field of Classification Search
CPC ............ H02G 3/08; H02G 3/081; H02G 3/04; H02G 3/0406; H02G 3/0418; H02G 3/0431; H02G 3/0437; B60R 16/0215; B60R 16/00; B60R 16/0207; H05K 5/00; H05K 5/02; H05K 5/0204; H05K 5/0217; H05K 7/00
(Continued)

(56) References Cited

U.S. PATENT DOCUMENTS 7,232,950 B2 * 6/2007 Kaneko .................. H01R 13/73
  174/50
7,291,024 B2 * 11/2007 Kiyota ................ B60R 16/0238
  439/76.2
(Continued)

FOREIGN PATENT DOCUMENTS

CN  102290755 A  12/2011
CN  103078278 A  5/2013
(Continued)

OTHER PUBLICATIONS

Office Action dated Feb. 5, 2018 by the State Intellectual Property Office of P.R. China in counterpart Chinese Patent Application No. 201710063702.8.
(Continued)

*Primary Examiner* — Angel R Estrada
(74) *Attorney, Agent, or Firm* — Sughrue Mion, PLLC

(57) ABSTRACT

A resin molded body (10) includes a metal attachment member (22) and an extension part (33, 34) extending from the resin molded body. At least one part of the metal attachment member (22) is exposed in a mounting surface (20a) of the resin molded body. The mounting surface (20a) is to be facing to the mounting target when the resin molded body is fixed to a mounting target. At least one part of the extension part (33, 34) is protruded outside the mounting surface. A protrusion length of the at least one part of the extension part (33, 34) from the mounting surface is larger than a protrusion length of the metal attachment member (22) from the mounting surface. The at least one part is configured to allow deforming in a direction away from the mounting target when the resin molded body is fixed to the mounting target.

7 Claims, 8 Drawing Sheets

(58) Field of Classification Search
USPC ..... 174/50, 53, 57, 135, 59, 17 R, 480, 481, 174/72 A, 68.1, 68.3; 220/3.2–3.8, 4.02; 439/76.1, 76.2, 949; 361/600, 601; 248/68.1, 49
See application file for complete search history.

(56) References Cited

U.S. PATENT DOCUMENTS

| | | | | |
|---|---|---|---|---|
| 7,622,671 | B2 * | 11/2009 | Yamamoto | B60R 16/0215 174/481 |
| 7,671,275 | B2 * | 3/2010 | Kubota | H01R 13/5227 174/17 R |
| 8,269,103 | B2 * | 9/2012 | Kiyota | H05K 5/0234 174/50 |
| 8,884,160 | B2 * | 11/2014 | Hara | B60R 16/0238 174/50 |
| 8,931,653 | B2 * | 1/2015 | Kita | H02G 3/08 174/520 |
| 2003/0189140 | A1 | 10/2003 | Takeuchi | |
| 2003/0213876 | A1 | 11/2003 | Takeuchi | |
| 2004/0115973 | A1 | 6/2004 | Fujii et al. | |
| 2005/0029005 | A1 | 2/2005 | Arai et al. | |
| 2005/0045361 | A1 | 3/2005 | Arai et al. | |
| 2011/0272547 | A1 | 11/2011 | Gotou et al. | |

FOREIGN PATENT DOCUMENTS

| | | |
|---|---|---|
| CN | 203722162 U | 7/2014 |
| CN | 204821412 U | 12/2015 |
| JP | 09074639 A | 3/1997 |
| JP | 2004-192882 A | 7/2004 |
| JP | 2005-57968 A | 3/2005 |
| JP | 2007-267470 A | 10/2007 |
| JP | 2013-169803 A | 9/2013 |
| JP | 2014-220866 A | 11/2014 |

OTHER PUBLICATIONS

Chinese Office Action dated Dec. 29, 2018 issued by the State Intellectual Property Office of P.R. China in counterpart Chinese Application No. 201710063702.8.

Communication dated Jan. 22, 2019, issued by the Japanese Patent Office in counterpart Japanese Application No. 2016-019272.

Notification of Reasons for Refusal, issued Apr. 9, 2019, in corresponding JP Application No. 2016-019272, 5 pages in English and Japanese.

* cited by examiner

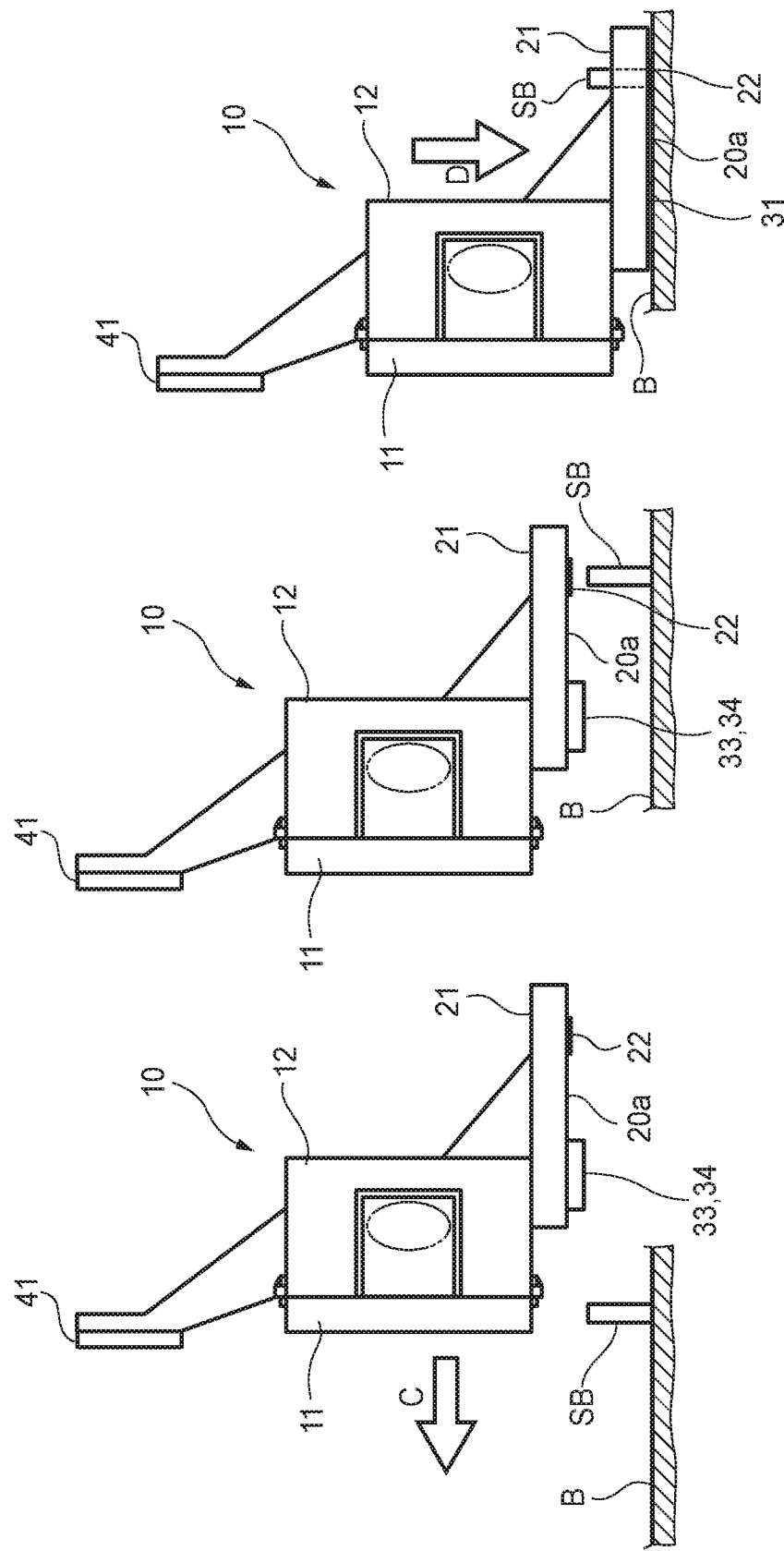

RESIN MOLDED BODY

CROSS-REFERENCES TO RELATED APPLICATION(S)

This application is based on and claims priority from Japanese Patent Application No. 2016-019272 filed on Feb. 3, 2016, and the entire contents of which are incorporated herein by reference.

BACKGROUND

Field of the Invention

The present invention relates to resin molded bodies, and more particularly, a resin molded body that includes a metal attachment member (such as a collar made of metal) and can be fixed to a mounting target (such as a vehicle body).

Description of Related Art

Such a resin molded body has been used as, for example, a protector for a wire harness having inside its body a space in which electric wires constituting the wire harness can be received. The protector is typically used for protecting the electric wires received inside the protector as well as for fixing and wiring the wire harness on a mounting target such as a vehicle body while. The protector for the wire harness will be simply referred to as "protector" below.

For example, one of protectors in the background art (hereinafter referred to as "background-art protector") has a mounting hole through which a stud bolt extending from a vehicle body can be inserted, and the mounting hole is reinforced by a collar made of metal (metal collar). In addition, the metal collar is attached to the protector by a commonly-used method such as insert molding.

As for details of the above connection structure, refer to JP 2014-220866 A.

SUMMARY

A metal attachment member (such as the metal collar in the background-art protector) may be exposed in a surface of a resin molded body (or may be protruded from the surface in some case) due to a request on design of the resin molded body or an inevitable reason on molding the resin molded body. In this case, when the resin molded body is fixed to a mounting target (such as a vehicle body), a worker needs to pay attention to the resin molded body so that the exposed or protruded metal attachment member can be prevented from touching and damaging the mounting target. As a result, the work of fixing the resin molded body to the mounting target becomes so troublesome that the working efficiency cannot be enhanced easily.

An object of the present invention is to provide a resin molded body capable of improving working efficiency in fixing the resin molded body to a mounting target as much as possible in spite of a metal attachment member exposed or protruded from a surface of the resin molded body.

Embodiments of the present invention provide the following items (1) to (4).

(1) A resin molded body to be fixed to a mounting target, the resin molded body comprising:

a metal attachment member; and an extension part extending from the resin molded body, at least one part of the metal attachment member being exposed in a mounting surface of the resin molded body, the mounting surface being to be facing to the mounting target upon the resin molded body being fixed to the mounting target, at least one part of the extension part being protruded outside the mounting surface, a protrusion length of the at least one part from the mounting surface being larger than a protrusion length of the metal attachment member from the mounting surface, the at least one part being configured to allow deforming in a direction away from the mounting target upon the resin molded body being fixed to the mounting target.

(2) The resin molded body according to item (1), wherein the metal attachment member is a metal collar defining a mounting hole to be used to receive a columnar member extending from the mounting target, the extension part is located to avoid a moving path of the columnar member, the columnar member moves relatively to the resin molded body through the moving path when the resin molded body is fixed to the mounting target in accordance with a predetermined fixing procedure.

(3) The resin molded body according to item (1) or item (2), wherein the resin molded body further comprises a pair of wall parts extending from the resin molded body, each top portion of the pair of wall parts is located in the same plane as the mounting surface, the extension part has a cantilever shape having: a fixed end located inside a space between the pair of wall parts; and a free end protruded outside the space, and the cantilever shape allows the extension part to deform to be received inside the space when the resin molded body is fixed to the mounting target.

(4) The resin molded body according to any one of item (1) to item (3), wherein the mounting target is a vehicle body, and the resin molded body is a protector for a wire harness.

According to first aspect of the invention, relating to the item (1), the protrusion length of the extension part is larger than the protrusion length of the metal attachment member (for example, a collar made of metal) which member has been exposed in the mounting surface of the resin molded body (for example, a protector). Accordingly, when the resin molded body approaches the mounting target (for example, a vehicle body) in order to be fixed to the mounting target, the extension part can touch the mounting target earlier than the metal attachment member. The extension part extending from the resin molded body is made of resin. The extension part hardly damages the mounting target, as compared with the metal attachment member. It is hence possible to reduce a burden on a worker who engages in fixing the resin molded body to the mounting target, as compared with a case where the extension part is absent. Further, the extension part can be deformed in a direction away from the mounting target when the resin molded body is fixed to the mounting target. Hence, there is no fear that the extension part may impede the fixation to the mounting target.

Thus, according to the resin molded body of the item (1), working efficiency in fixing the resin molded body to the mounting target can be improved as much as possible even if the metal attachment member is exposed or protruded from a surface of the resin molded body, as compared with the case in which the extension part is absent as in the background-art protector.

The "resin molded body" may be any molded body as long as it includes a metal attachment member and it can be attached to a predetermined mounting target, and specific applications of the "resin molded body" are not limited. Examples of such resin molded bodies may include a protector for a wire harness, a fuse box, a relay box, etc.

The "protrusion length" of the extension part represents a distance (length of a perpendicular line) from the mounting surface of the resin molded body in a part where the distance is longer than any other part of the extension part located outside the mounting surface of the resin molded body (in a direction approaching the mounting target). The same definition can be applied to the "protrusion length" of the metal attachment member.

In addition, in some arrangement, some application, some shape, etc. of the metal attachment member (for example, in a case where the metal attachment member is provided to reinforce a corner part of the resin molded body), attention should be paid to contact between the metal attachment member and the mounting target, even if the protrusion length of the metal attachment member is zero (the mounting surface and the metal attachment member are flush with each other). Hence, in the resin molded body having the item (1), the protrusion length of the metal attachment member does not necessarily have a positive value (that is, the metal attachment member does not necessarily be protruded from the mounting surface), but may be zero (that is, the metal attachment member may be simply exposed).

According to second aspect of the invention, relating to the item (2), interference between the extension part and the columnar member (for example, a stud bolt formed in a vehicle body) extending from the mounting target can be avoided when the resin molded body is fixed to the mounting target in a predetermined fixing procedure (for example, a fixing procedure for fixing a protector to a vehicle body is generally predetermined). Hence, there is no fear that the extension part may impede the work of fixing the resin molded body to the mounting target. Thus, the working efficiency in the fixation to the mounting target can be further improved.

According to third aspect of the invention, relating to the item (3), when the resin molded body is fixed to the mounting target, the extension part is received inside the space between the pair of wall parts, and the top portions of the pair of wall parts serve as parts of the mounting surface. Accordingly, there is no fear that the extension part may be interposed between the mounting target and the mounting surface. Thus, inconveniences such as rattling after the fixation can be prevented. As a result, even when the extension part is provided in the resin molded body, the resin molded body can be fixed to the mounting target by a usual work (similar to that in a case where the extension part is absent) without necessity of special consideration.

According to fourth aspect of the invention, relating to the item (4), the aforementioned items (1) to (3) can be applied to a protector for a wire harness, in which improvement of working efficiency and protection of the mounting target are required especially. It is hence possible to improve the working efficiency as much as possible when the protector is fixed to the vehicle body.

As described above, a resin molded body according to the above aspects of the invention allows for improving working efficiency in fixing the resin molded body to a mounting target as much as possible in spite of the metal attachment member exposed or protruded from a surface of the resin molded body.

Several aspects of the invention have been described briefly above. The further details of the invention will be made clearer if the following description is read through with reference to the accompanying drawings.

BRIEF DESCRIPTION OF THE DRAWINGS

FIG. 6A, FIG. 6B, and FIG. 6C are views showing respective steps for fixing the protector in FIG. 1 to a vehicle body. In particular, FIG. 6A, FIG. 6B, and FIG. 6C are views (side views similar to FIG. 3) in which positions of the protector in the steps are arranged in time-series order.

FIG. 7A is a view showing a state before fixation, and FIG. 7B is a view showing a state after the fixation.

DETAILED DESCRIPTION

Embodiment

A resin molded body according to an embodiment of the invention will be described below with reference to the drawings. In the embodiment, a protector for a wire harness (hereinafter referred to as "protector 10") will be described as the resin molded body by way of example.

Figure 1:
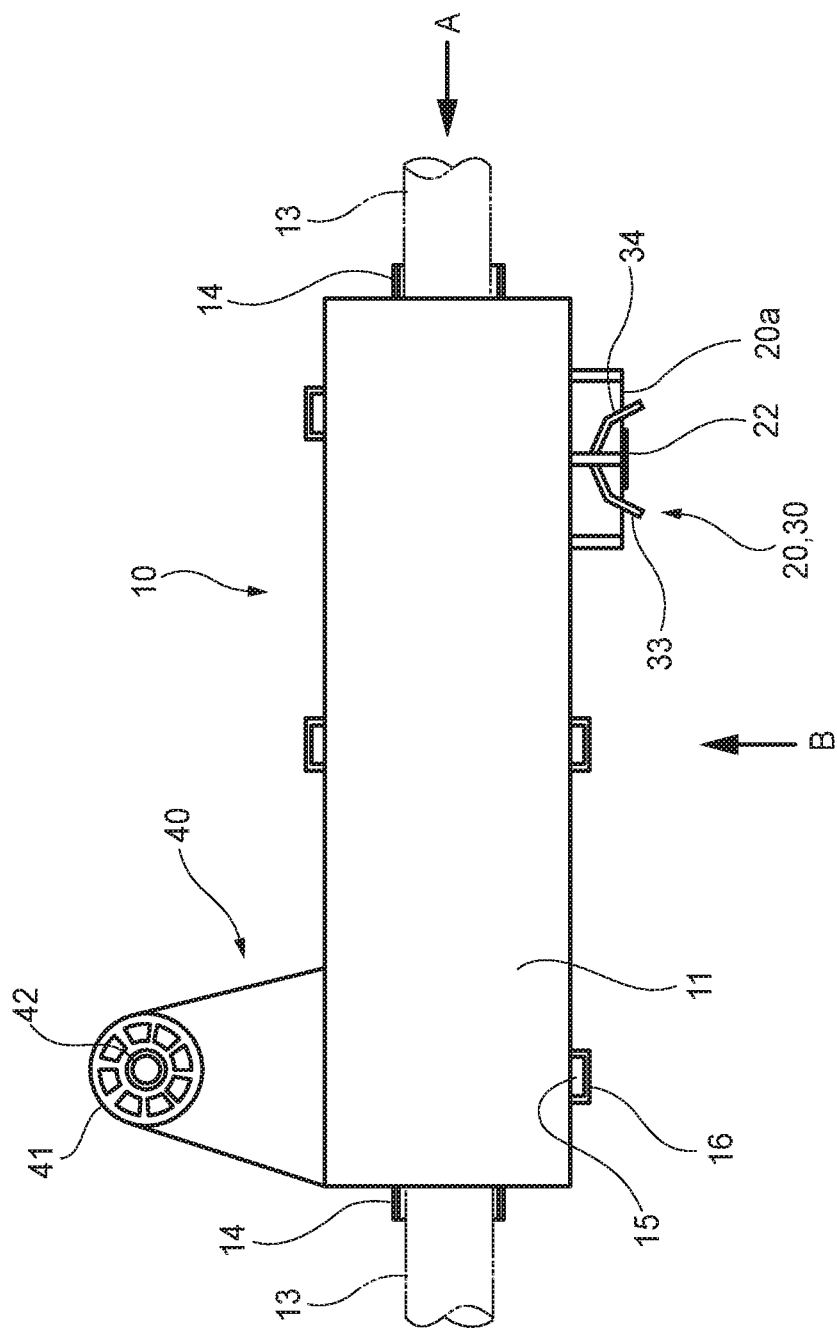
FIG. 1 is a plan view of a protector according to an embodiment of the invention.
Figure 2:
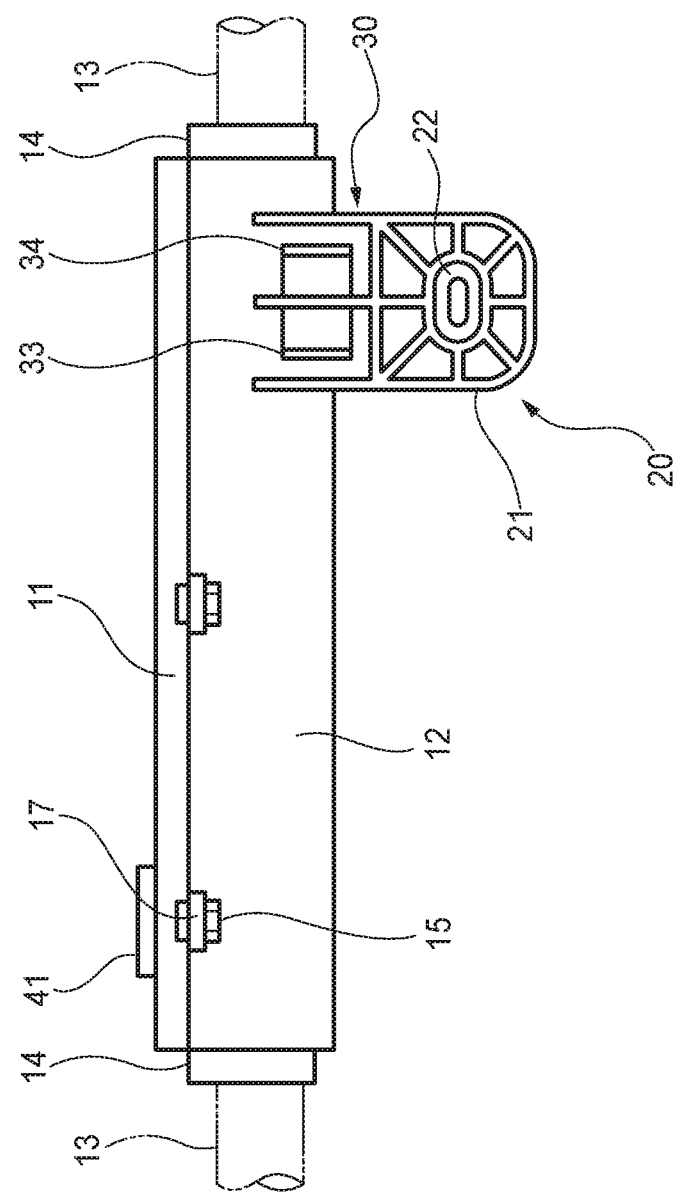
FIG. 2 is a side view (view from arrow A) of the protector in FIG. 1.
Figure 3:
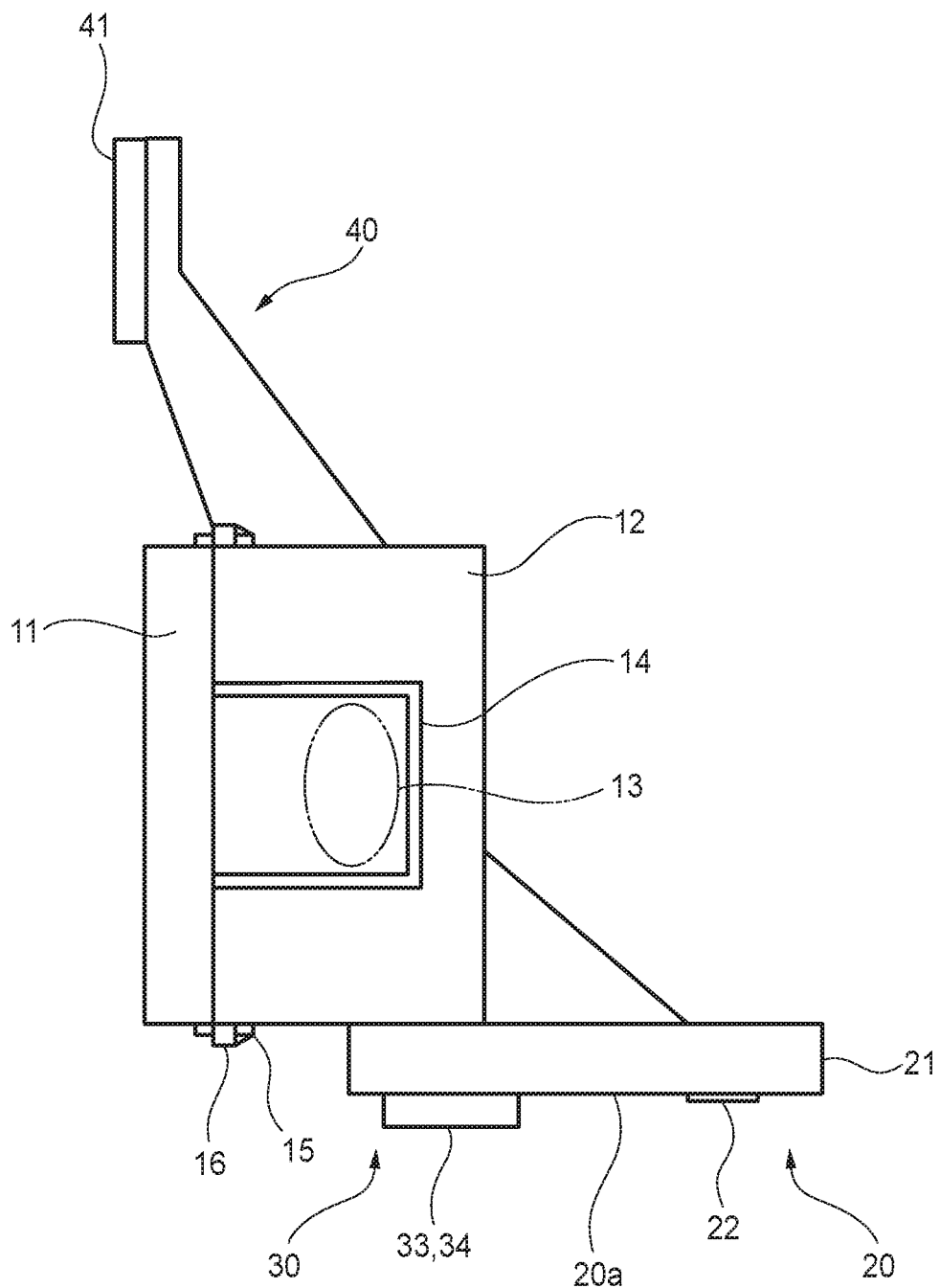
FIG. 3 is a side view (view from arrow B) of the protector in FIG. 1.

As illustrated in FIG. 1 to FIG. 3, the protector 10 has a cylindrical shape which is formed by a cover portion 11 and a body portion 12, so that an electric wire group 13 in which a plurality of electric wires have been bundled can be received to penetrate a hollow portion of the cylindrical shape. The cover portion 11 and the body portion 12 are formed in a method such as injection molding out of synthetic resin. The protector 10 and the electric wire group 13 are constituent elements of a wire harness. In addition, the protector 10 is fixed to a vehicle body B of a vehicle in a predetermined fixing procedure (see FIG. 6A to FIG. 6C), as will be described later.

The structure of the protector 10 will be described more in detail. The body portion 12 is formed into a box-like shape to form a reception portion for receiving the electric wire group 13. In the body portion 12, faces each including an electric wire lead-out port 14 and a face to which the cover portion 11 can be attached are made open. The cover portion 11 is attached to the body portion 12 so as to cover the open face of the body portion 12 to thereby close the reception portion of the body portion 12. Hook-like engaging portions 15 provided in side faces of the cover portion 11 and ring-like engaged portions 16 provided in side faces of the body portion 12 are engaged with each other. Thus, the cover portion 11 is fixed to the body portion 12.

The protector 10 includes a fixation bracket portion 20, a buffer portion 30, and a fixation bracket portion 40 as a structure for fixing the protector 10 to a vehicle body B (see FIG. 6A to FIG. 6C). The fixation bracket portion 20 is formed in a side face of the protector 10. The buffer portion 30 is adjacent to the fixation bracket portion 20. The fixation bracket portion 40 is formed in another side face of the protector 10 than the side face in which the fixation bracket portion 20 is formed.

Figure 4A:
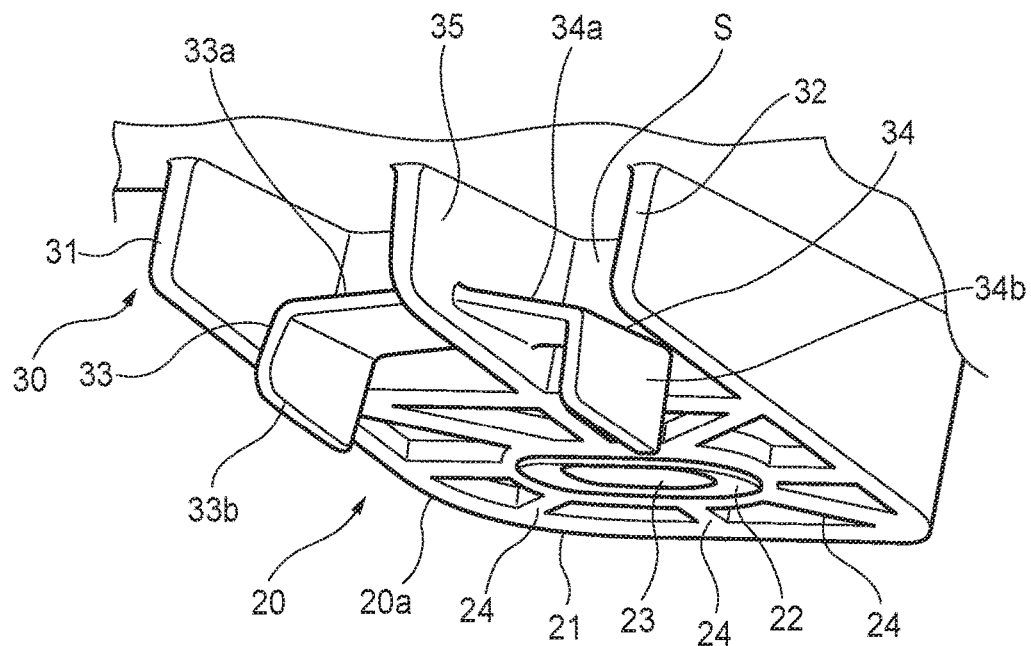
FIG. 4A and FIG. 4B are views for explaining a peripheral structure of a mounting surface of the protector in FIG. 1.
Figure 4B:
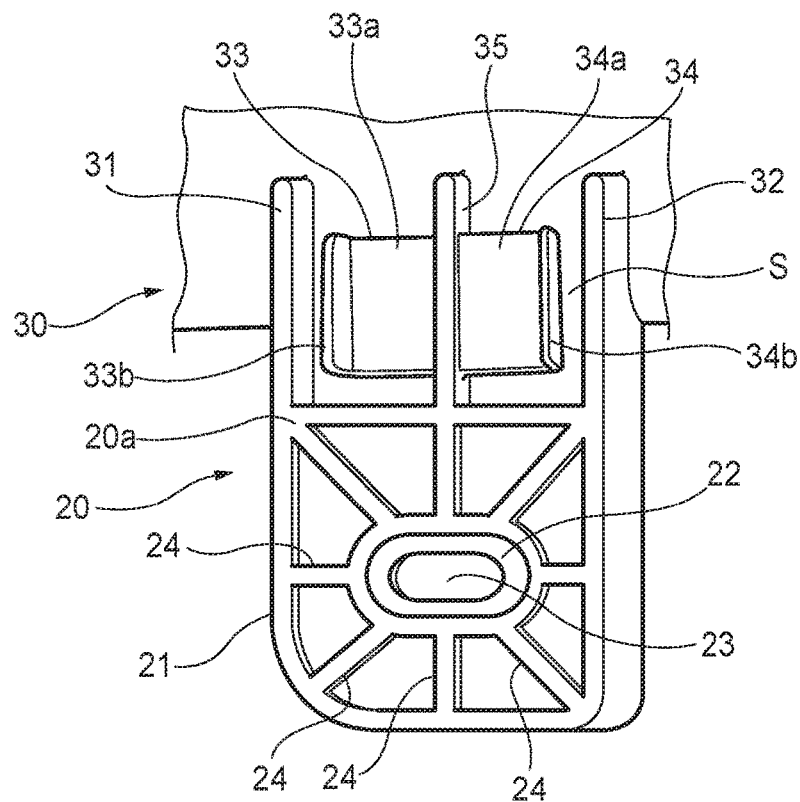

As illustrated in FIG. 4A and FIG. 4B, a collar 22 made of metal, which is a metal attachment member, is provided in a fixation portion 21 of the fixation bracket portion 20. The collar 22 is formed out of a metal material such as iron, stainless steel, etc. The collar 22 has an annular shape of a flat plate as a whole, and includes a mounting hole 23 (a through hole penetrating the flat plate in the thickness direction thereof) at the center thereof. The mounting hole 23 is so large that a stud bolt SB (columnar member) extending from the vehicle body B as will be described later can be inserted into the mounting hole 23. The collar 22 is formed by insert molding when the body portion 12 of the protector 10 is formed. In addition, a face (lower face in FIG. 4A) of the fixation bracket portion 20 opposed to the vehicle body B corresponds to a mounting surface 20a of the protector 10.

The collar 22 is provided to be exposed in the mounting surface 20a of the fixation bracket portion 20. More specifically the collar 22 is provided so that a part of the collar 22 can be protruded slightly from a peripheral resin part thereof toward the vehicle body B which is a mounting target. The fixation portion 21 has a plurality of ribs 24 extending radially from the collar 22 toward the periphery in the mounting surface 20a. Due to the ribs 24, the strength of the fixation portion 21 can be enhanced while the thickness of the fixation portion 21 is suppressed.

In addition, as will be described later, the stud bolt SB is inserted into the mounting hole 23 of the collar 22 from the mounting surface 20a side, and a nut (not illustrated) is screwed down to the stud bolt SB from the opposite side to the mounting surface 20a. Thus, the fixation portion 21 is fastened and fixed to the vehicle body B. In other words, the protector 10 is fixed to the vehicle body B in the fixation portion 21 of the fixation bracket portion 20. The fixation portion 21 is provided with the collar 22 made of metal. There is no fear that the fixation portion 21 may be damaged even if the fixation portion 21 suffers a fastening force from the stud bolt SB and the nut. Thus, the fixation portion 21 can be firmly fixed to the vehicle body B. Further, since the mounting hole 23 of the collar 22 is a hole long in the width direction of the fixation portion 21 (the right/left direction in FIG. 4B), the position where the fixation portion 21 is fixed to the vehicle body B can be adjusted finely within a range where the stud bolt SB can move inside the mounting hole 23.

The buffer portion 30 is provided in a position adjacent to the fixation bracket portion 20 (specifically, in a position adjacent to the fixation portion 21). The buffer portion 30 includes a pair of wall parts 31, 32 extending from the body portion 12 of the protector 10 in a direction to approach the vehicle body B. The wall parts 31, 32 are disposed substantially in parallel with each other and at a predetermined distance from each other. The wall parts 31, 32 are formed so that their top portions can be located on the same plane as the mounting surface 20a. As a result, the buffer portion 30 can have a space S between the pair of wall parts 31, 32. In addition, the top portions of the wall parts 31, 32 serve as parts of the mounting surface 20a when the protector 10 is fixed to the vehicle body B.

Figure 5:
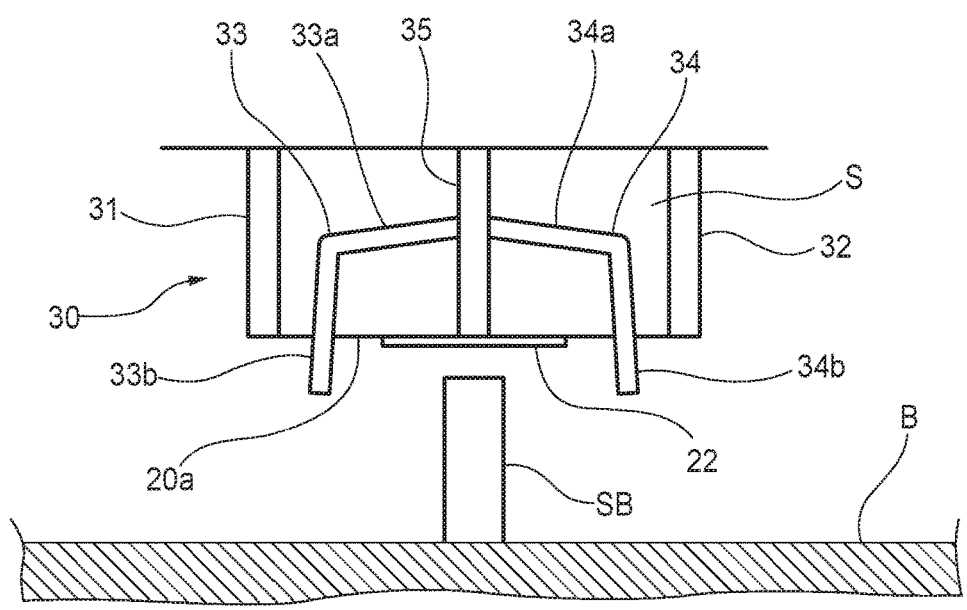
FIG. 5 is a side view of the periphery of the mounting surface of the protector in FIG. 1.

As illustrated in FIG. 4A, FIG. 4B, and FIG. 5, the buffer portion 30 includes a pair of extension parts 33, 34. Each of the extension parts 33, 34 has a cantilever shape in which a fixed end is located inside the space S between the pair of wall parts 31, 32, and a free end is protruded outside the space S. More specifically, each of the extension parts 33, 34 is formed so that the fixed end can be connected to a side face of a support wall portion 35 which is formed between the wall part 31 and the wall part 32 to extend from the body portion 12 of the protector 10 toward the vehicle body B. In other words, the extension part 33 is formed to extend from one side face of the support wall portion 35, and the extension part 34 is formed to extend from the opposite side face of the support wall portion 35. The extension parts 33, 34 can be deformed (elastically deformed) to be bent centering the fixed end. In addition, the support wall portion 35 is formed in parallel with the wall parts 31, 32 so that a top portion of the support wall portion 35 can be located on the same plane as the mounting surface 20a.

The extension parts 33, 34 have a shape in which a coupling plate portions 33a, 34a extending laterally (in the left/right direction in FIG. 5) from the support wall portion 35 and a contact plate portions 33b, 34b extending from an end portion of the coupling plate portions 33a, 34a toward the vehicle body B have been connected to each other. Distances between forward ends of the contact plate portions 33b, 34b of the extension parts 33, 34 and the mounting surface 20a are larger than a distance between a lower face of the collar 22 and the mounting surface 20a. In other words, protrusion lengths of the extension parts 33, 34 from the mounting surface 20a are larger than protrusion length of the collar 22 from the mounting surface 20a.

When the protector 10 is fixed to the vehicle body B in a predetermined fixing procedure (which will be described in detail later. See FIG. 6A to FIG. 6C), the stud bolt SB extending from the vehicle body B moves to pass through a space between the extension part 33 and the extension part 34. In other words, the extension parts 33, 34 are disposed to bypass a moving path in which the stud bolt SB will move relatively to the protector 10 when the protector 10 is fixed to the vehicle body B in the predetermined fixing procedure. As a result, the extension parts 33, 34 can be prevented from interfering with the stud bolt SB.

Referring to FIG. 1 to FIG. 3 again, the fixation bracket portion 40 includes a fixation portion 41, and a mounting hole 42 provided in the fixation portion 41. The fixation bracket portion 40 may be fastened to the vehicle body B by a member such as a bolt inserted into the mounting hole 42, or may be fastened to the vehicle body B in such a manner that another stud bolt than the stud bolt SB to be inserted into the collar 22 is inserted into the mounting hole 42, and a nut is then screwed down to the inserted stud bolt. Thus, the protector 10 is fixed to the vehicle body B also in the fixation portion 41 of the fixation bracket portion 40.

Steps for fixing the protector 10 to the vehicle body B will be described below.

First, as illustrated in FIG. 6A, the protector 10 is moved in a direction of the illustrated arrow C toward a predetermined fixation position in which the stud bolt SB of the vehicle body B has been provided erectly. In addition, during this movement, the protector 10 moves along a moving path in which the protector 10 will move when the protector 10 is fixed to the vehicle body B in a predetermined fixing procedure (for example, a procedure based on a working manual for workers) for fixing the protector 10 to the vehicle body B. Conversely speaking, the stud bolt SB moves relatively to the protector 10 along a moving path in an opposite direction to the moving direction of the protector 10. The stud bolt SB moving relatively to the protector 10 passes between the extension part 33 and the extension part 34 (also see FIG. 5). Thus, interference between the buffer portion 30 (the extension parts 33, 34) and the stud bolt SB can be avoided. In addition, the fixing procedure of the protector 10 is generally predetermined in consideration of the wiring shape of the electric wire group 13 to which the protector 10 has been attached, the mounting position of the protector 10 in the vehicle body B, the workability of a worker, etc.

Next, as illustrated in FIG. 6B, the position of the protector 10 is adjusted so that the collar 22 (mounting hole 23) provided in the fixation portion 21 of the fixation bracket portion 20 can be disposed adjacently to the stud bolt SB.

Next, as illustrated in FIG. 6C, the protector 10 is moved in a direction of the illustrated arrow D (toward the vehicle body B), and the stud bolt SB is inserted into the collar 22 (mounting hole 23). Further, a nut (not illustrated) is screwed down to the stud bolt SB so as to fasten and fix the fixation portion 21 of the fixation bracket portion 20 to the vehicle body B. Thus, the protector 10 is fixed to the vehicle body B in the fixation bracket portion 20.

Figure 7A:
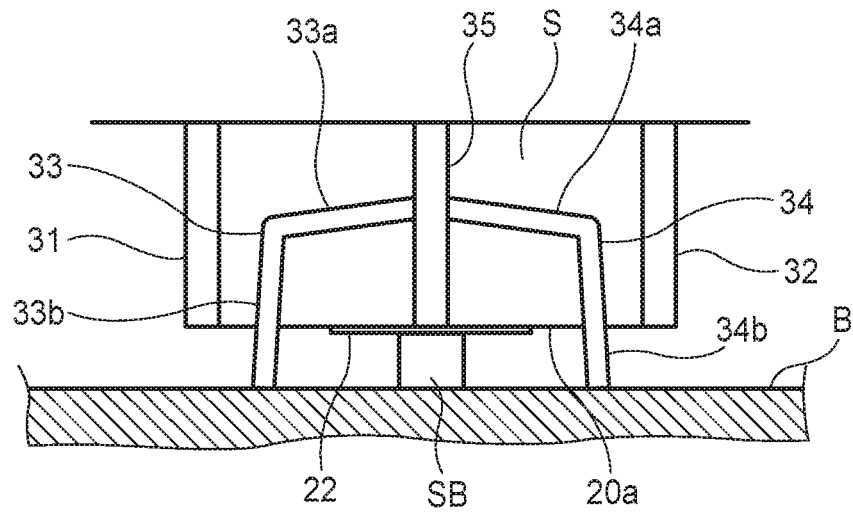
FIG. 7A and FIG. 7B are side views of the periphery of the mounting surface of the protector in FIG. 1. In particular.
Figure 7B:
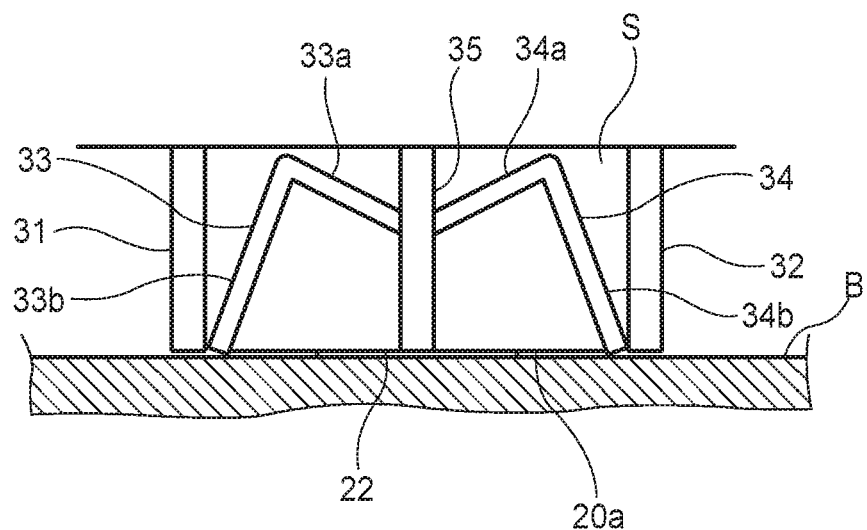

As illustrated in FIG. 7A and FIG. 7B, the extension parts 33, 34 are deformed to be received inside the space S so that the protector 10 can be displaced from a position (FIG. 7A) in which the forward ends of the contact plate portions 33b and 34b of the extension parts 33, 34 contact with the vehicle body B, to a position (FIG. 7B) in which the collar 22 contacts with the vehicle body B. In addition, in the state illustrated in FIG. 7B, the mounting surface 20a of the protector 10 is separated from the vehicle body B exactly by a distance corresponding to the protrusion length of the collar 22. However, the distance between the both is extremely small. Hence, in the state illustrated in FIG. 7B, it can be said that the mounting surface 20a of the protector 10 (including the top portions of the pair of wall parts 31, 32, and the top portion of the support wall portion 35) is substantially in contact with the vehicle body B.

As described above, according to the protector 10 in the embodiment of the invention, the protrusion lengths of each extension parts 33, 34 are larger than the protrusion length of the collar 22 made of metal and exposed in the mounting surface 20a of the protector 10. Accordingly, when the protector 10 approaches the mounting target in order to be fixed to the vehicle body B, the extension parts 33, 34 can contact with the vehicle body B earlier than the collar 22. The extension parts 33, 34 extending from the protector 10 are made of resin. The extension parts 33, 34 hardly damage the mounting target, as compared with the collar 22 made of metal. Thus, a burden on the worker can be reduced when the protector 10 is fixed to the vehicle body B, as compared with a case where the extension parts 33, 34 are absent. Further, each of the extension parts 33, 34 can be deformed in a direction away from the vehicle body B when the protector 10 is fixed to the vehicle body B. There is no fear that the extension parts 33, 34 may interfere with the fixation to the vehicle body B directly.

Accordingly, working efficiency in fixing the protector 10 to the vehicle body B can be improved as much as possible even if the collar 22 is exposed or protruded from the surface of the protector 10, as compared with the case in which the extension parts 33, 34 are absent.

Further, interference between the extension parts 33, 34 and the stud bolt SB extending from the vehicle body B can be avoided when the protector 10 is fixed to the vehicle body B based on the predetermined fixing procedure. Thus, there is no fear that the extension parts 33, 34 may interfere with the fixation of the protector 10 to the vehicle body B. It is hence possible to further improve the working efficiency during the fixation.

Further, when the protector 10 is fixed to the vehicle body B, the extension parts 33, 34 are received inside the space S between the pair of wall parts 31, 32, and the top portions of the pair of wall parts 31, 32 serve as parts of the mounting surface 20a. Accordingly, there is no fear that the extension parts 33, 34 may be interposed between the vehicle body B and the mounting surface 20a. Thus, inconveniences such as rattling after the fixation can be prevented. As a result, even when the extension parts 33, 34 are provided in the protector 10, the protector 10 can be fixed to the vehicle body B by a usual work (similar to that in the case where the extension parts 33, 34 are absent) without necessity of special consideration.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

Figure 8:
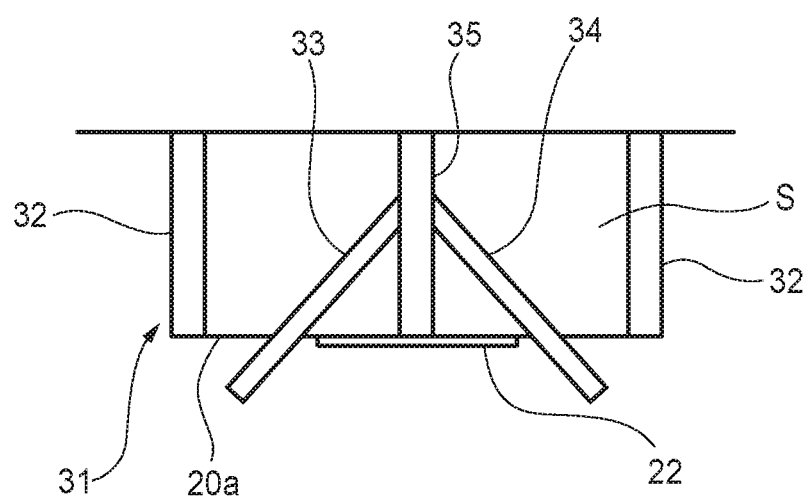
FIG. 8 is a side view of the periphery of a mounting surface of a protector according to another embodiment.

For example, the shape of extension parts 33, 34 in the buffer portion 30 are not limited to the shape illustrated in the aforementioned embodiment. For example, the extension parts 33, 34 may be designed to have cantilever shapes extending straightly (without bending as in the aforementioned embodiment) from the opposite side portions of the support wall portion 35 as illustrated in FIG. 8.

Further, for example, the extension parts 33, 34 in the aforementioned embodiment can be elastically deformed when the protector 10 is fixed. However, the extension parts 33, 34 may be designed to be plastically deformed when the protector 10 is fixed.

Further, the aforementioned embodiment shows the protector 10 for a wire harness as a resin molded body by way of example. However, another example of the resin molded body according to the invention may include a fuse box and a relay box to be fixed to a vehicle body. In addition, another example of the metal attachment member may include a member for reinforcing a corner part of the resin molded body.

Here, the features of the aforementioned embodiment of the resin molded body according to the invention will be summarized and listed briefly in the following paragraphs [1] to [4].

[1]

A resin molded body (10) to be fixed to a mounting target (B), the resin molded body (10) comprising:

a metal attachment member (22); and an extension part (33, 34) extending from the resin molded body (10), at least one part of the metal attachment member (22) being exposed in a mounting surface (20a) of the resin molded body (10), the mounting surface (20a) being to be facing to the mounting target (B) upon the resin molded body (10) being fixed to the mounting target (B), at least one part of the extension part (33, 34) being protruded outside the mounting surface (20a), a protrusion length of the at least one part from the mounting surface (20a) being larger than a protrusion length of the metal attachment member (22) from the mounting surface (20a), the at least one part being configured to allow deforming in a direction away from the mounting target (B) upon the resin molded body (10) being fixed to the mounting target (B).

[2]

The resin molded body (10) according to item [1], wherein the metal attachment member (22) is a metal collar defining a mounting hole to be used to receive a columnar member (SB) extending from the mounting target (B), the extension part (33, 34) is located to avoid a moving path of the columnar member (SB), the columnar member (SB) moves relatively to the resin molded body (10) through the moving path when the resin molded body (10) is fixed to the mounting target (B) in accordance with a predetermined fixing procedure.

[3]

The resin molded body (10) according to item [1] or item [2], wherein the resin molded body (10) further comprises a pair of wall parts extending from the resin molded body (10), each top portion of the pair of wall parts is located in the same plane as the mounting surface (20a), the extension part (33, 34) has a cantilever shape having: a fixed end located inside a space (S) between the pair of wall parts; and a free end protruded outside the space (S), and the cantilever shape allows the extension part (33, 34) to deform to be received inside the space (S) when the resin molded body (10) is fixed to the mounting target (B).

[4]

The resin molded body (10) according to any one of item [1] to item [3], wherein the mounting target (B) is a vehicle body, and the resin molded body (10) is a protector for a wire harness.

REFERENCE SIGNS LIST 10 protector (resin molded body)
20a mounting surface
22 collar (metal attachment member)
23 mounting hole
31, 32 wall part
33, 34 extension part
B vehicle body (mounting target)
S space
SB stud bolt (columnar member)

The invention claimed is:

1. A protector for a wire harness configured to be fixed to a mounting target, the protector comprising:
   a resin molded body,
   a metal attachment member integrally retained in the resin molded body; and
   an extension part extending from the resin molded body,
   at least one part of the metal attachment member being exposed in a mounting surface of the resin molded body, the mounting surface being configured to face the mounting target upon the resin molded body being fixed to the mounting target,
   at least one part of the extension part protruding outside the mounting surface, a protrusion length of the at least one part of the extension part from the mounting surface being larger than a protrusion length of the metal attachment member from the mounting surface, the at least one part of the extension part being configured to allow deformation thereof in a direction away from the mounting target upon the resin molded body being fixed to the mounting target.

2. The protector according to claim 1, wherein
   the metal attachment member is a metal collar defining a mounting hole configured to receive a columnar member extending from the mounting target,
   the extension part being located to avoid a moving path of the columnar member such that the columnar member moves relative to the resin molded body through the moving path when the resin molded body is fixed to the mounting target in accordance with a predetermined fixing procedure.

3. The protector according to claim 1, wherein
   the resin molded body further comprises a pair of wall parts extending from the resin molded body, a top portion of each of the pair of wall parts is located in the same plane as the mounting surface,
   the extension part has a cantilever shape having: a fixed end located inside a space between the pair of wall parts; and a free end protruded outside the space between the wall parts, and the cantilever shape allows the extension part to deform to be received inside the space between the wall parts when the resin molded body is fixed to the mounting target.

4. The protector according to claim 1, wherein
   the mounting target is a vehicle body.

5. The protector according to claim 1, wherein
   the metal attachment member is integrally molded within the resin molded body.

6. The protector according to claim 1, wherein the protrusion length of the at least one part of the extension part is larger than the protrusion length of the metal attachment member in a direction in which the extension part protrudes from the resin molded body.

7. The protector according to claim 1, wherein
   the resin molded body includes a support wall portion,
   the extension part includes a first extension part and a second extension part, the first extension part and the second extension part being positioned on either side of the support wall portion, and
   each of the first extension part and the second extension part being deformable in the direction away from the mounting target upon the resin molded body being fixed to the mounting target.

* * * * *